United States Patent [19]

Dutcher

[11] Patent Number: 5,382,093

[45] Date of Patent: Jan. 17, 1995

[54] REMOVABLE TEMPERATURE MEASURING DEVICE

[75] Inventor: Dale E. Dutcher, Pasadena, Tex.

[73] Assignee: Gay Engineering & Sales Co., Inc., Pasadena, Tex.

[21] Appl. No.: 212,491

[22] Filed: Mar. 11, 1994

Related U.S. Application Data

[63] Continuation of Ser. No. 993,611, Feb. 22, 1993, abandoned.

[51] Int. Cl.6 .............................................. G01K 1/08
[52] U.S. Cl. ................................. 374/208; 379/147; 379/179
[58] Field of Search .............. 374/147, 149, 208, 209; 136/229, 230, 232, 233

[56] References Cited

U.S. PATENT DOCUMENTS

| | | | |
|---|---|---|---|
| 3,143,439 | 8/1964 | Hansen | 136/229 |
| 3,901,080 | 8/1975 | Hilborn | 374/147 |
| 4,023,411 | 5/1977 | Escher | 136/233 |
| 4,324,945 | 4/1982 | Sivyer | 136/230 |
| 4,349,031 | 9/1982 | Perlin | 374/209 |
| 4,721,533 | 1/1988 | Phillippi et al. | 374/208 X |
| 4,854,729 | 8/1989 | Lovato | 374/147 X |
| 5,058,195 | 10/1991 | Knepler | 374/209 |

FOREIGN PATENT DOCUMENTS 1040351  9/1983  U.S.S.R. ............... 374/147

OTHER PUBLICATIONS

"Heat Transfer Sleeve", *IBM Technical Disclosure Bulletin*, vol. 8, No. 10, Mar. 1966.

*Primary Examiner*—William A. Cuchlinski, Jr.
*Assistant Examiner*—G. Bradley Bennett
*Attorney, Agent, or Firm*—Robert W. B. Dickerson

[57] ABSTRACT

A device for measuring the skin temperature of a conduit the device including a curved, sheathed thermocouple element adapted to be removably inserted within a similarly curved guide tube which carries a positioning pad at one end, the guide tube, in turn being received by a like curved, insulated shield.

11 Claims, 2 Drawing Sheets

REMOVABLE TEMPERATURE MEASURING DEVICE

This is a continuation of copending application(s) Ser. No. 07/993,611 filed on Feb. 22, 1993 now abandoned.

BACKGROUND OF THE INVENTION

Many industrial processes, especially the petrochemical industry, require the accurate, dependable measurement of temperature outside the surface or skin of tubes, pipes or conduits within a furnace or other vessel. The information gained thereby may allow the avoidance of overheating and possible rupture. To detect potential overheating situations, measuring devices, such as thermocouples, may be placed at locations expected to encounter the highest radiation and flame exposure. A common problem encountered involves the generally short life of unprotected thermocouples which are exposed to these temperature extremes. Further, since it is generally necessary to attach the measuring devices, i.e., the thermocouple cables, to the pipe whose temperature is being measured, usually by welding, thermocouple replacement is both time consuming and expensive. Normally, such replacement may occur only during process shut down. To replace such a thermocouple, the old assembly must normally be ground from the outside surface of the pipe, the operator taking extreme care not to weaken the pipe by grinding beneath the surface of the pipe. A replacement thermocouple would then be welded to the pipe and connected to the monitoring system. It is to the dual problems of thermocouple removal and reinstallation that Applicant's invention is directed.

HISTORY OF THE PRIOR ART

The prior art reference believed by Applicant to be the closest to this invention is U.S. Pat. No. 3,901,080. In fact this application is intended to improve upon, and overcome problems encountered by, said reference.

SUMMARY OF THE INVENTION

A receptacle for a sheathed thermocouple comprises a curved tube. Such tube carries a slotted pad at one end, and may be secured to a conduit whose temperature is to be monitored. The sheathed thermocouple is removably insertable within the tube. Likewise, a curved shield may be secured to the measured conduit, overlaying the receptacle to protect it from excessive ambient temperature.

DESCRIPTION OF THE INVENTION

As previously mentioned, this invention represents an improvement over the device of U.S. Pat. No. 3,901,080. The prime area of novelty resides in this invention having a removable and replaceable thermocouple.

Figure 1:
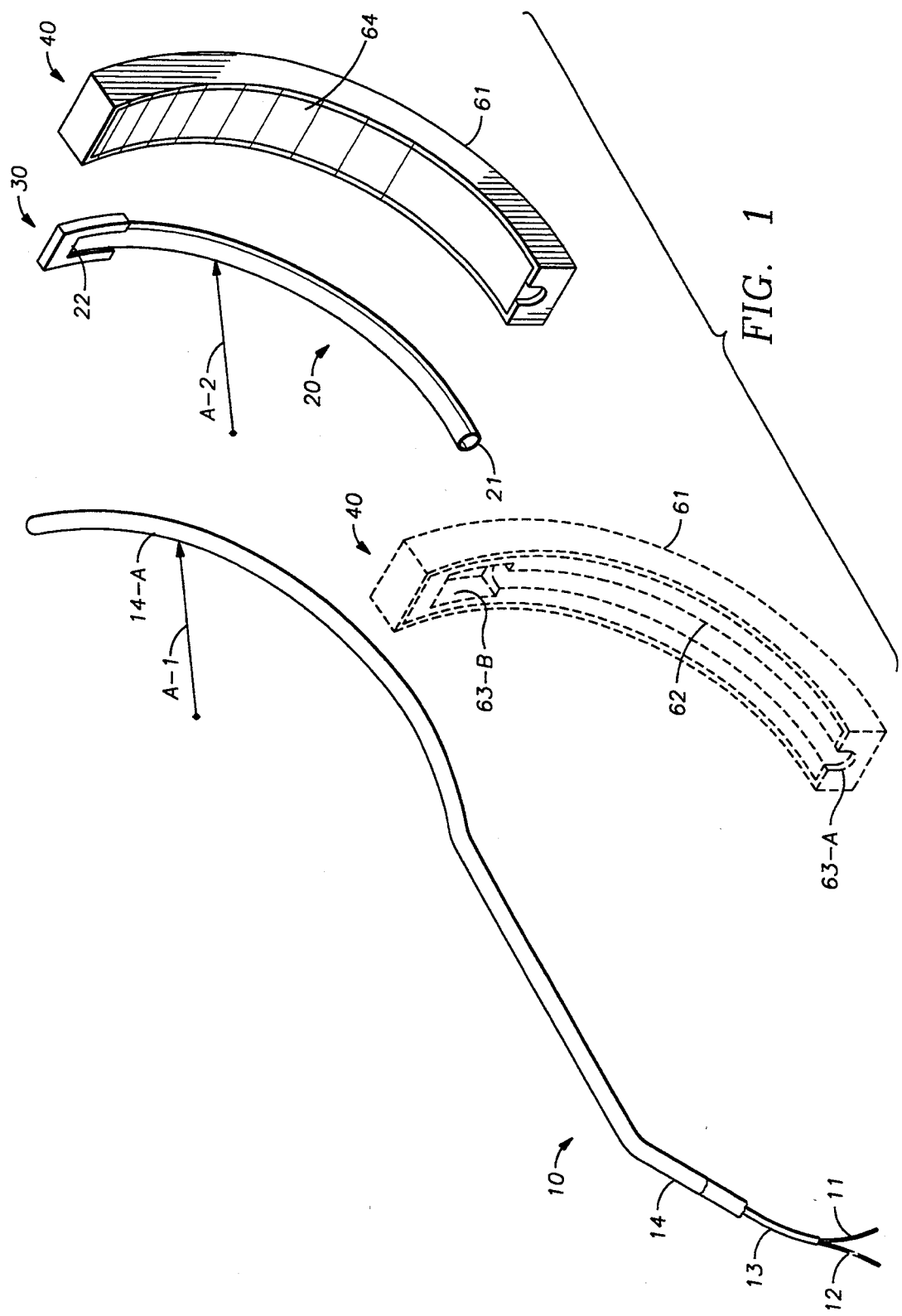
FIG. 1 is an exploded perspective of the components of this invention, depicted in solid lines, with a phantom-line perspective of an alternative shield embodiment.

The measuring instrument itself comprises a sheathed thermocouple generally illustrated in FIG. 1 by the numeral 10. Its components include a pair of lead wires 11 and 12 formed of differing materials such that when joined at one end an e.m.f. is generated which is a function of the temperature at the junction. Insulation and/or packing forming a cable 13 may surround the lead wires. The cable 13 may be fully inserted within deformable outer jacket 14. Additional insulation may surround cable 13 within jacket 14. The thermocouple junction would be positioned at or near jacket end 14-A. The opposite ends of lead wires 11, 12, would be connected to instrumentation (not shown) for providing information concerning the temperature at the thermocouple junction.

Figure 2:
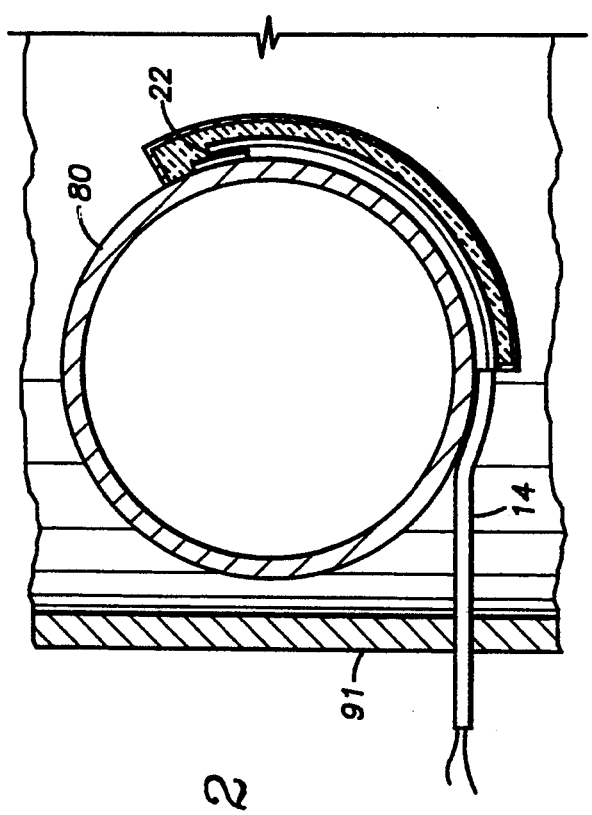
FIG. 2 is a vertical section through the shield attached to the conduit whose temperature is being measured.
Figure 3:
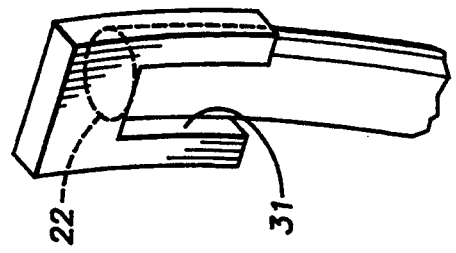
FIG. 3 is a detail, in perspective of the guide tube for the sheathed thermocouple carrying the thermocouple positioning member.

Guide tube 20 is fabricated with one open end at 21, a closed end at 22, and a disc or pad 30 attached to said closed end. Pad 30 is of u-shaped configuration, by virtue of cutout 3i, the confines of which receive end 22. Said member 30 serves to position the thermocouple contained within thermocouple jacket end 14-A, when received in tube closed end 22, in a position proximate the skin of conduit 80 (FIG. 2), such conduit extending within the confines of walls 91 (only one being shown) of a vessel or furnace.

The inside diameter of tube 20 is of sufficient extent to allow the thermocouple element 10 to have its end 14-A inserted within the tube's open end 21 and thrust through the entire length of the tube with the thermocouple junction ultimately positioned adjacent tube end 22. This guide tube has an arcuate configuration of approximately 120°, with a radius of curvature A2 substantially that of radius of curvature A1 of thermocouple element 10.

Shield member 40, as illustrated in phantom lines in FIG. 1, is substantially like the shield 60 of the mentioned prior art reference. It includes a curved, refractory or insulation filled, body 61. It is approximately u-shaped in cross section, by virtue of hemi-tubular recess 62 in the insulation. A slot 63-A is provided in the body portion 61, at one end of the recess 62, and a disc or pad shaped insulation recess 63-B at the other end. In the preferred solid line embodiment of FIG. 1, the insulation 64 filling body 61 is blanket style material, sometimes known as KAO-WOOL, which is compressible so as to form itself around tube 29 and pad 30. The shield 40 is provided to shield the thermocouple junction from giving false high readings resulting from excessive thermal radiation at said junction. This shield too has an arcuate configuration of about 120°, and a radius of curvature approximating A1 and A2.

During normal installation, guide tube 20 would be positioned on conduit 80 at the location to be measured. The attachment pad 30, already having end 22 of guide tube 20 secured thereto, would be attached to conduit 80, as by welding or other applicable method. The heat shield 40 is then positioned over the guide tube 20, including pad 30, and similarly affixed to conduit 80. The sheathed thermocouple 10 then has end 14-A inserted into the open end 21 of guide tube 20, by laying the curved section inboard of end 14-A along the diameter of the conduit 80. The thermocouple element 10 is then rotated approximately 120° into the guide tube 20 until the end 14-A, containing thermocouple junction, firmly contacts closed end 22. The thermocouple element may be removably, but securely held in position, relative to tube 20, by any number of suitable fastener means (not shown), such as by reusable clips anchoring member 10 to any of conduit 80, tube 20 or shield 40.

Likewise, replacement of the thermocouple element 10 is accomplished by first disengaging the mentioned clip, or fastener means, and rotating member 10 out of the guide tube 20. A new thermocouple element 10 would then be installed, as previously described. Obviously, extensive grinding and welding would not be required, as long as the guide tube and shield remain in tact.

Figure 4:
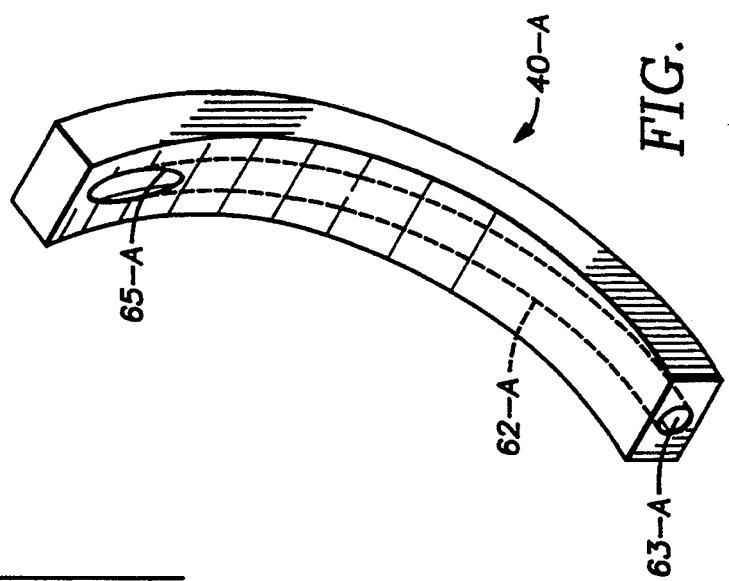
FIG. 4 is a perspective of a modified shield having a built-in thermocouple guide way.

In the modification of FIG. 4, shield 40-A replaces shield 40 as well guide tube 20 of FIG. 1. Said shield 40-A includes passageway or bore 62-A extending through the shield's insulation from opening 63-A to exit 65-A. This exit may be a simple opening through which end 14-A of member 10 may communicate with conduit 80. Alternatively, exit 65-A may comprise a pad (not illustrated) in heat exchanging communication with both conduit 80 and end 14A of the sheathed thermocouple 10. The assembly and disassembly would be substantially identical. In this modification passageway 62-A serves as guide tube having an open end 63-A with the other end closed by being dead ended by a pad or by conduit 80 blocking said other end.

The savings in repair and replacement, and especially in down time of the process equipment would obviously be substantial. Numerous modifications would be possible by one skilled in the art without departing from the spirit of the invention. Nevertheless, the scope of the invention is limited only by the following claims.

I claim:

1. In a temperature monitoring assembly adapted to be positioned adjacent a structure in order to make temperature measurements at the surface of said structure, the improvement comprising:
   a sheathed thermocouple comprising a pair of lead wires forming a junction at one end, said lead wires being insulatingly positioned within cable means, said cable means being positioned within a tubular jacket;
   a curved, hollow, tubular guide for said sheathed thermocouple, said guide having a passageway substantially therethrough with an open end and, opposite thereto, a closed end, said guide carrying means for permitting said guide to be secured to the outer periphery of said structure; and
   said sheathed thermocouple being so configured as to be removably insertable within said guide passageway, when said guide is secured to said structure, to a position wherein said junction is adjacent said guide passageway's closed end, whereby said thermocouple may be removed from said guide without removing said guide from said structure.

2. The assembly of claim 1 wherein said guide securing means comprises a slotted connector member secured to one end of said guide.

3. The assembly of claim 2 and also including a curved shield adapted to be secured to said structure, said shield including means for insulatingly receiving said tubular guide, said thermocouple, guide and shield, when assembled on said structure, each includes a portion having a radius of curvature approximating that of the adjacent portion of said structure.

4. In a temperature monitoring assembly adapted to be positioned adjacent a monitored structure and intermediate said structure and a thermal radiation shield in order to make temperature measurements at the surface of said structure, said assembly comprising:
   a curved thermocouple guide tube having a closed and an open end and a first radius of curvature; and
   a sheathed thermocouple comprising a pair of lead wires forming a junction at one end, said lead wires being insulatingly positioned within cable means, said cable means being inserted within a tubular jacket, said thermocouple being arcuately configured proximate its said junction and having a second radius of curvature substantially the same as that of said guide tube's first radius of curvature, said thermocouple, including its said tubular jacket, being removably insertable within said guide tube to a position wherein said junction is adjacent said guide tube's closed end.

5. The assembly of claim 4 and including connector means for securing said guide tube to said monitored structure, said securing means comprising a pad secured to said closed end of said guide tube.

6. A temperature measuring device adapted to be positioned adjacent a monitored structure, said device utilizing a sheathed thermocouple having a pair of lead wires forming a junction at one end with said lead wires being insulatingly positioned within a cable, said cable, in turn being positioned within a tubular jacket, said measuring device including:
   curved guide means for slidably and releasably receiving said thermocouple said guide means including a hollow, tubular body, open at one end and closed at the other end, said tubular body having a radius of curvature approximating that of said monitored structure, whereby said guide means may be positioned adjacent the outer wall of said structure.

7. The device of claim 6, and including means for securing said guide means to said structure, said securing means comprising:
   pad means for receiving said tubular body's closed end positioning the same adjacent said structure's outer wall, said pad means being adapted to be secured to said structure's outer wall.

8. The device of claim 7 wherein said pad means' receiving means comprises a slot in said pad for receiving said tubular body's closed end.

9. The device of claim 8 wherein said pad includes a surface correlative in configuration to said structure's outer wall.

10. The device of claim 7 and including shield means having a body portion with a radius of curvature approximating that of said monitored structure, and, centrally of said shield means' body portion is an arcuately extending, insulation-containing section for receiving and shielding said guide means, said shield means including means permitting said shield means to be secured to said structure's outer wall in a guide means shielding position.

11. The device of claim 10 wherein said insulation is sufficiently compressible as to form itself around said guide means and said pad means when said shield means is secured to said structure's outer wall.

* * * * *